Feb. 4, 1969
JAMES E. WEBB
ADMINISTRATOR OF THE NATIONAL AERONAUTICS
AND SPACE ADMINISTRATION
METHOD FOR MAKING A HEAT INSULATING AND ABLATIVE STRUCTURE
Filed Feb. 11, 1965
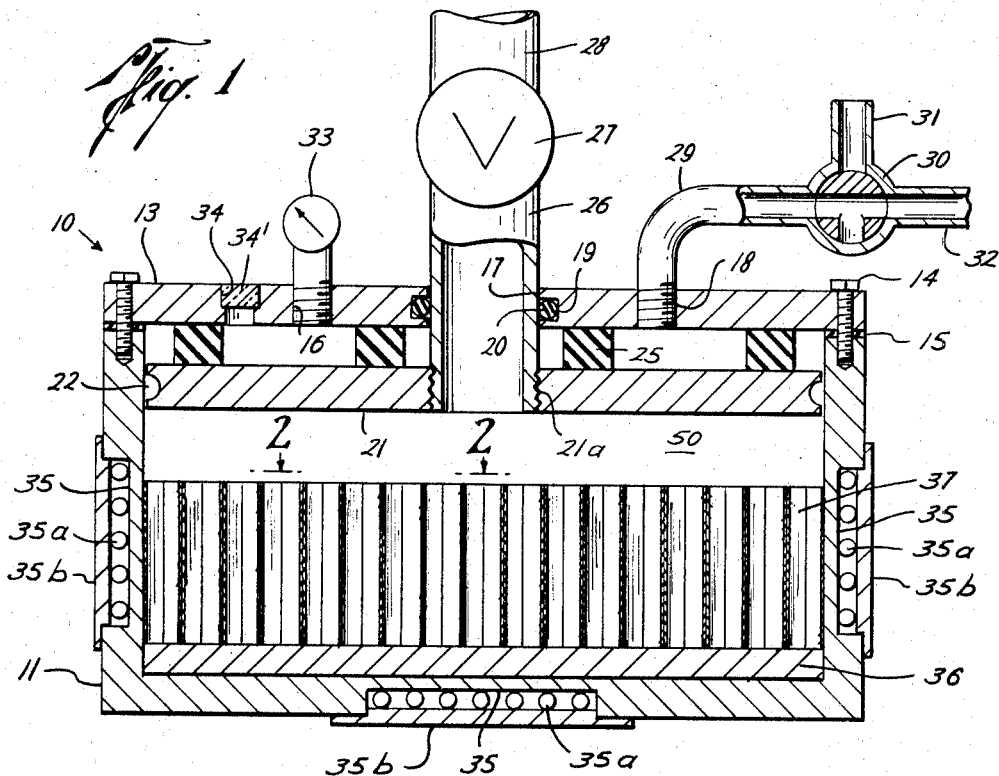
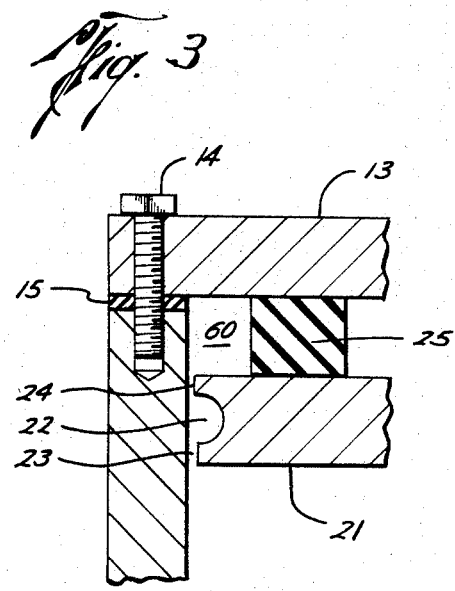
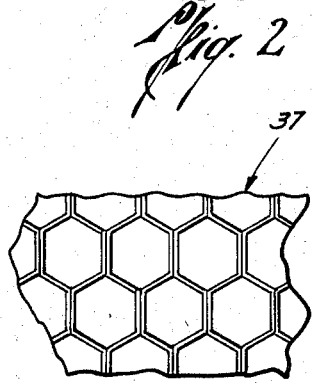
Clive A. Newcombe
John H. Proemsey
INVENTORS
BY
ATTORNEYS

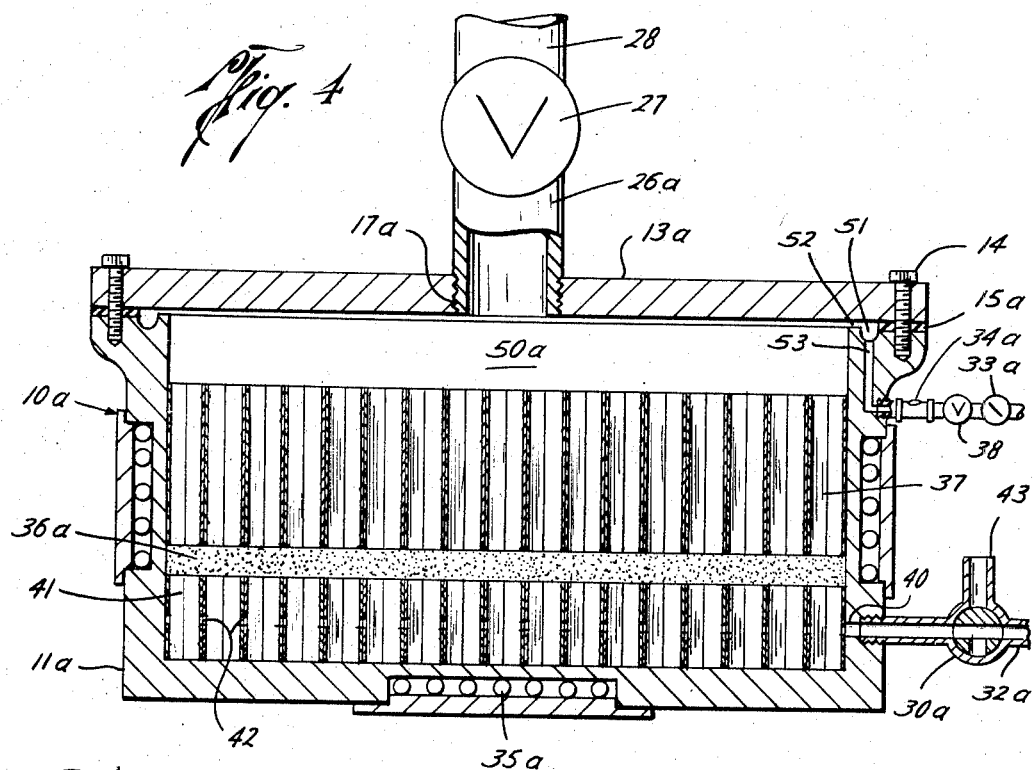
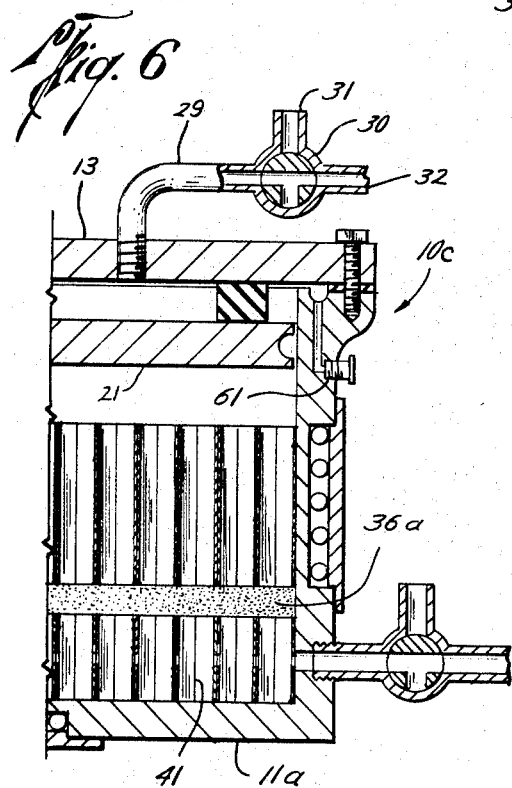
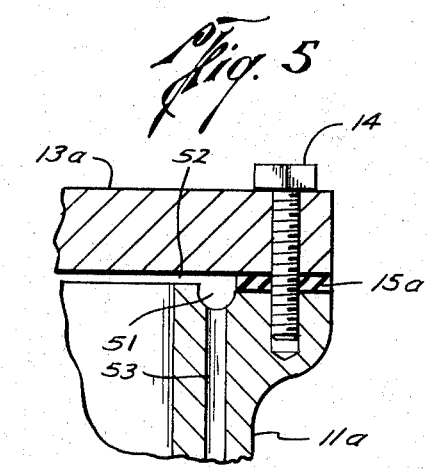
Clive A. Newcombe
John H. Proemsey
INVENTORS

United States Patent Office 3,425,885
Patented Feb. 4, 1969

3,425,885
METHOD FOR MAKING A HEAT INSULATING AND ABLATIVE STRUCTURE
James E. Webb, Administrator of the National Aeronautics and Space Administration, with respect to an invention of Clive A. Newcombe, Ferguson, and John H. Proemsey, Maplewood, Mo.
Filed Feb. 11, 1965, Ser. No. 432,032
U.S. Cl. 156—242                                    3 Claims
Int. Cl. B32b *3/12;* B64g *1/00*

ABSTRACT OF THE DISCLOSURE

Procedure for filling a honeycomb matrix with de-aerated paste filler for the construction of ablative heat shields for spacecraft, wherein the matrix is subjected to a vacuum to evacuate the air from the cells of the matrix; the paste filler is injected into the evacuated cells; pressure is applied to the paste to insure complete filling; the vacuum is released; and finally, the resultant structure is heated and allowed to cool.

---

The invention described herein may be manufactured and used by or for the government of the United States of America for governmental purposes without the payment of any royalties thereon or therefor.

This invention relates to a method for fabricating a heat insulating and ablation structure, and more particularly relates to a method for uniformly filling small diameter cavities with a highly viscous heat ablative material to fabricate a structure which is capable of functioning as a heat shield for space reentry vehicles.

In space travel the heat generated by a vehicle reentering the earth's atmosphere is so intense that without some protective means therefor the vehicle will readily catch fire and burn. The most commonly used protective means consists of attaching a structure having high heat insulative and ablative properties (commonly called a heat shield) to the leading edge of the vehicle to absorb, radiate, and ablate the reentry heat away from the main body of the vehicle.

In order for such a heat shield to achieve the necessary dissipation of heat, it must possess certain characteristics which include, among others, the following: a high surface temperature to reduce heat input to the surface of the material and to increase the amount of heat dissipated by re-radiation, sensible heat, and latent heat; a high surface emissivity to increase the amount of heat dissipated by re-radiation; ability to produce large volumes of gas upon decomposition to thicken the boundary layer and thus reduce heat input from the boundary layer to the ablating surface; a low thermal conductivity to reduce heat transfer to the back side structure; and a high specific heat to reduce heat transfer to the back side structure and to dissipate heat by storage.

Materials necessary to provide the above characteristics, however, have little structural integrity under extreme heat conditions such as those encountered upon reentry. In order to use these desired materials, a special structural base for the heat shield had to be developed which would allow the desired ablative materials to be incorporated therein and which would at the same time maintain the integrity of these materials under all normally encountered conditions. Such a structural base is one which consists of a substrate having a non-metallic honeycomb matrix bonded thereto. The desirable ablative materials, upon being filled into the cells of this honeycomb matrix, exhibit the high structural integrity which is required during the reentry stage of spaceflight.

This structure achieves the necessary integrity even if the ablative material is normally brittle or of a low density. The honeycomb matrix allows the ablative material, when heated, to expand only in a perpendicular direction with respect to the base and prevents expansion of the material in a parallel direction which would "flatten" the ablative layer and reduce the thickness thereof, and accordingly reduce the protective value of the ablative material. Also, this matrix prevents huge chunks of the material from breaking off during reentry, which would be disastrous to the entire vehicle.

In the past the cells of such honeycombed matrices had to be manually filled by the use of hypodermic syringes, caulking guns, or the like. This is a tedious and time-consuming process which does not always produce desired results since some of the matrix cells are found to be only partially filled. This partial filling is due to the fact that the size of the cells of these honeycombed matrices are extremely small in cross-sectional area (approximately .0187 inch in diagonal width), and the ablative material which has a very high viscosity, does not readily flow into the cells. Also, when the cells are filled under normal atmospheric conditions using these manual methods, tiny air bubbles are trapped in some of the cells by the ablative material. These air bubbles are highly detrimental to the successful functioning of the heat shield since under extreme heat conditions these bubbles will expand to force some of the ablative material out of the cells.

The present invention provides a relatively quick and reliable method for filling small diameter cavities of a matrix with a highly viscous material so that each of the cavities are uniformly filled to the same density. This is done by placing the substrate with the matrix mounted thereon in a special mold which is then evacuated to remove the air from both the mold and the cells of the matrix. After the air is removed, and with the vacuum being constantly maintained, filler material which has been previously de-aired by stirring in a vacuum, or some other suitable means, is introduced under pressure into the mold and into the cells of the matrix. Since there is no air in either the cells or the filler, the filler, aided by the feeding pressure, will readily flow into the cells. After the mold is sufficiently filled an additional pressure is applied to the excess filler which remains on top of the cells to insure complete filling of the matrix cells. If the filler is of the type which must be cured by heating, the mold is then heated while the pressure on the filler is maintained. After the filler has set the pressure is released and any excess filler that may be still present can be machined off or otherwise removed.

The invention will be better understood by referring to the drawings in which like numerals identify like parts in the different figures and in which:

FIG. 1 is a vertical sectional view of the apparatus used in one embodiment of the invention wherein a matrix is mounted on an impermeable substrate;

FIG. 2 is a top view taken along line 2—2 of FIG. 1 of the honeycombed matrix which is filled in accordance with the present invention;

FIG. 3 is an enlarged partial vertical sectional view of the apparatus in FIG. 1;

FIG. 4 is a vertical sectional view of the apparatus used in a second embodiment of the invention wherein a matrix is mounted on a permeable substrate;

FIG. 5 is an enlarged partial vertical sectional view of the apparatus in FIG. 4;

FIG. 6 is a partial vertical sectional view of an apparatus used in a third modification of the invention wherein a matrix is mounted on a permeable substrate.

Referring more specifically to FIG. 1, molding unit 10 is used to fabricate a heat ablative structure wherein honeycombed matrix 37 which is positioned on impermeable substrate 36 is filled with a highly viscous heat ablative filler. The mold unit 10 comprises a box-like body portion 11 having a bottom with side walls extending upward therefrom. The wall and bottom are shown as being integral, but it should be obvious that they could be made in separate pieces and joined in any known manner. The open end of body 11 is closed by removable lid 13 which is secured to the body walls by bolts 14. Gasket 15 is provided between lid 13 and body 11 to insure an airtight connection therebetween. Lid 13 has four openings 34, 16, 17, 18 therethrough. The center opening 17 has groove 19 for receiving an O-ring seal 20 for a purpose which will be explained below.

A ram 21 is positioned in body 11 and has an opening 21a through the center thereof. An inlet pipe 26 is connected to the opening in the ram and extends through opening 17 in lid 13. O-ring 20 is in sealing but slidable engagement with the inlet pipe so that the pipe and the ram can move relative to the body and the lid without any loss in pressure. Ram stops 25 are affixed by means of an adhesive, or the like, to the upper side of the ram to prevent the ram from contacting the underside of lid 13. It should be understood that these stops could also be affixed to the lid, or they could be freely positioned on top of the ram without affecting in any way the operation of the mold. Groove 22 extends completely around the periphery of the ram 21. Ram 21 is constructed (see FIG. 3) so that there will be a slight clearance 23 between lower or filling chamber 50 and groove 22. Clearance 23 ranges from 0.01 to 0.02 inch, while a second much smaller clearance 24, which is between groove 22 and upper chamber 60, measures in the range of 0.002 inch. The purpose of the groove and the clearances will become apparent in the description below of the method carried out by mold 10.

Inlet pipe 26 is connected to an inlet valve 27 which in turn is connected to a de-aired filler reservoir (not shown) by conduit 28. A connection 29 is threaded into opening 18 and has 3-way valve 30 connected thereto. Valve 30 has connected thereto conduit 31 leading to an air pressure source (not shown) and conduit 32 leading to a vacuum source (not shown). Vacuum gauge 33 is in communication with the interior of mold 11 through opening 17.

Lid 13 can be made of transparent material such as "Plexiglas" or, if made of opaque material as shown in the drawings, opening 34 is provided therethrough which is closed by transparent plug 34'. The walls and bottom of mold body 11 have recesses 35 therein in which heating coils 35a are positioned. Cover plates 35b are used to enclose and protect coils 35a.

The operation of the apparatus shown in FIG. 1 is as follows. The impermeable substrate 36, such as an aluminum plate, and honeycombed matrix 37, are first placed in the mold. The matrix can be prebonded on the substrate or it can be bonded thereto by the ablative filler during the filling operation. The honeycombed matrix is preferably a non-metallic type which is comprised of a reinforcement and a binder. The reinforcement is preferably glass fibers (both conventional woven "E" glass and woven high silica leached "E" glass), but may also be made of woven quartz, woven nylon, asbestos, woven carbon, woven graphite, and the like. The binder of the non-metallic honeycomb is preferably a strong char-forming organic resin such as temperature resistant phenolic, epoxy, silicone, and the like. After impermeable substrate 36 and matrix 37 are in place, ram 21 is inserted into body 11 of the mold, and lid 13 with its connections in place is then sealed on the body. Inlet valve 27 is closed and valve 30 is opened to vacuum line 32. This will evacuate both the mold and the cells of matrix 37, the air being pulled upward from the cells and lower chamber 50, through 24, 22, 23 on the periphery of the ram, around stops 24, and out connection 29. The vacuum within the mold is then checked by closing valve 30 and observing gauge 33. The mold should be able to maintain a minimum of 26 inches of mercury vacuum in order for the process to give best results. Valve 30 is then reopened to vacuum line 32, after which inlet valve 27 is opened.

The filler material (not shown) which has been previously de-aired is fed under pressure into chamber 50 through inlet pipe 26. The relative size of chamber 50 (distance between matrix 37 and ram 21) is normally much smaller than shown, but it has been exaggerated in the figures for the sake of clarity. The filler material may be any organic, inorganic, or organic-inorganic composites which have the desired characteristics set forth above. Suitable materials include silicone rubber and formulated compounds based on solutions or dispersions of silicone, epoxy, phenolic, melamine, or acrylic modified with solids such as phenolic microballoons.

The filling operation is continued until the cells of matrix 37 and lower chamber 50 are filled and the filler has squeezed through clearances 23, 24 and groove 22 into upper chamber 60. This can be determined by visual observation through plug 34. It should be pointed out that while the extremely small clearances 23 and 24 allow the filler material to pass therethrough, they do nevertheless offer tremendous resistance to this viscous filler. When upper chamber 60 has been partially filled and clearances 23, 24, along with groove 22, are filled, inlet valve 27 is closed. Valve 30 is then switched from vacuum line 32 to air pressure line 31 to apply air pressure to the top of ram 21 to force it down against the excess filler in lower chamber 50. This will force filler material into any voids that may exist in the cells and insure complete filling of all cells in the honeycomb matrix. If the filler is of the type that must be cured by heating, electric coils 35 are turned on and heat is applied to mold 11 while the pressure of the ram is maintained. The mold is then cooled and the ablative structure is removed. Any excess filler material which may remain on the structure can be sanded or otherwise removed, leaving a completely filled honeycombed heat shield which is ready for use.

The apparatus shown in FIG. 4 is for filling a honeycombed matrix 37 wherein a permeable substrate 36a or base is to be used. Since the components of this modification are slightly different but very similar to those in FIG. 1, the same numerals with added letters are used to denote similar parts wherever feasible. Molding unit 10a of FIG. 2 comprises body 11a having a bottom with side walls thereon. On the upper ends of the side walls a groove 51 extends about the periphery thereof. An L-shaped passage 53 in the wall of the mold opens at one end into the lower portion of groove 51 and terminates at its other end in an opening on the external surface of the mold wall to which sight gauge 34a is attached. A shut-off valve section 38 connects the sight gauge with vacuum gauge 33a. The side walls of body 11a also have heating coils 35a positioned in recesses therein.

The open end of mold body 11a is closed by lid 13a which has a single opening 17a therethrough to which inlet pipe 25a is threaded. Inlet valve 27 is threaded to pipe 26a and is connected to a reservoir of de-aired filler (not shown) by pipe 28. The lid is secured by bolts 14 with gasket 15a being provided between the lid and the body to insure an airtight connection therebetween. With the lid in position, a small clearance 52 will exist between the lid and the wall of the mold which extends from the chamber 50a to groove 51 (see FIG. 5). The lower end of the body wall has a port 40 opening therethrough to which 3-way valve 30a is connected. Conduit 32a connects one opening of valve 30a to a vacuum source (not shown) and conduit 43 connects another opening of valve 30a to the atmosphere. Perforated support 41, made in the form of a honeycomb, can be made integral with the body or can be made separately and placed loosely at the bottom of the mold. The interiors of the cells of this honeycombed support are in communication with each other by means of perforations 42.

The operation of FIG. 2 is as follows. Permeable substrate 36a (such as Fiberglas reinforced plastic laminate which has been fabricated so as to be molecularly porous) and honeycomb matrix 37, are placed on perforated support 41 in the mold body 11a. Lid 13a with inlet pipe 26a connected thereto is sealed to body 11a. The inlet valve 27 is closed and valve 30a is opened to a vacuum source (not shown). This draws the air from chamber 50a through the cells of honeycomb matrix 37, through the permeable substrate 30a, through perforated support 41, and out port 40. Valve 30a is then closed to check the vacuum in the mold unit by means of vacuum gauge 33a (valve 38 being open at this time). The unit should be able to maintain a minimum vacuum of 26 inches of mercury. Valve 30a is again opened to the vacuum source, after which inlet valve 27 is opened to admit de-aired filler under pressure. With a continuous vacuum being maintained, the filling operation is continued until the cells of matrix 37, chamber 50a, a small clearance 52, and groove 51 are completely filled. This can be determined by observing the sight gauge 34a and when filler appears therein, valve 38 must be closed to protect the vacuum gauge from the filler. A constant pressure is maintained on the filler and valve 30a is slowly switched from vacuum to atmospheric pressure to allow the filler to cure. In those instances where heating is required, heating coils 35a are actuated to heat the mold in order to cure the filler. Upon completion of the curing operation the mold is allowed to cool and the structure is removed.

FIG. 6 discloses an apparatus used for filling the cells of a honeycombed matrix 37 which is mounted on permeable substrate 36a in substantially the same manner as set forth above in regard to the apparatus of FIG. 4, but also providing means to apply ram pressure to the access filler to insure complete filling of the cells.

Molding unit 10c utilizes the same body 11a and perforated honeycomb support 41 as does the apparatus of FIG. 4 except the sight gauge 34a, valve 38, and gauge 33a and their respective conduits have been replaced by threaded plug 61. The lid 13 and ram 21 with all connections thereto are identical to those shown in FIG. 1.

The operation of FIG. 6 is identical to the operation of FIG. 4 except another step is added thereto. When the filling operation is completed and inlet valve 27 is closed, air is admitted through valve 30 to force ram 21 downward to apply additional pressure to the filler in the same manner as the apparatus in FIG. 1.

It is obvious from the above descriptions that a simple and effective method is provided for filling an open-celled matrix whereby no air can be trapped in the cells, and each cell can be completely filled. As stated above, this is of vital importance in the manufacturing of heat shields for space vehicles where there can be no room for error. It is noted that while this type of finished structure is primarily for use in the construction of heat shields, it could also be used in fire-fighting equipment, to line blast furnaces, or in other situations where protection from intense heat is required.

What is claimed and desired to be secured by Letters Patent is:

1. A method of making a thermal insulating and ablative structure comprising the steps of bonding a small celled honeycomb matrix to a permeable substrate, placing the substrate and honeycomb matrix in a molding chamber, evacuating the chamber to remove the air from the cells of the honeycomb matrix, injecting a de-aired highly viscous, thermal insulating and ablative material into the chamber to fill the cells of the honeycomb matrix while maintaining the vacuum in the chamber, applying pressure to the material to insure complete filling of the cells, and releasing the vacuum to atmospheric pressure to allow the material to cure.

2. A method of making a thermal insulating and ablative structure comprising the steps of bonding a small celled honeycomb matrix to a substrate, placing the substrate and honeycomb matrix in a molding chamber, evacuating said chamber to remove the air from the cells of the honeycomb matrix, injecting a de-aired, highly viscous, thermal insulating and ablative material under pressure into the chamber to fill the cells of the honeycomb matrix while continuously maintaining the vacuum in the chamber and applying an additional pressure to the material to insure complete filling of the cells.

3. A method of making a thermal insulating and ablative structure comprising the steps of bonding a small celled honeycomb matrix to an impermeable substrate, placing the substrate and honeycomb matrix in a molding chamber, evacuating the chamber to remove the air from the cells of the honeycomb matrix, injecting a de-aired, highly viscous, thermal insulating and ablative material into the chamber to fill the cells of the honeycomb matrix while maintaining the vacuum in the chamber, releasing the vacuum after an excess of material has been injected in the chamber, and applying pressure to the material to insure complete filling of the cells.

References Cited

UNITED STATES PATENTS

| | | |
|---|---|---|
| 3,098,262 | 7/1963 | Wisotzky. |
| 2,236,968 | 4/1941 | Cunnington _____ 264—136 |
| 3,210,233 | 10/1965 | Kummer et al. _____ 161—68 |

ROBERT F. WHITE, *Primary Examiner.*

T. J. CARVIS, *Assistant Examiner.*

U.S. Cl. X.R.

264—90, 102, 258, 267; 161—68